US005307281A

United States Patent [19]
Wollmann

[11] Patent Number: 5,307,281
[45] Date of Patent: Apr. 26, 1994

[54] DEVICE FOR WEIGHING AND AUTOMATICALLY CALCULATING POSTAGE FOR A MAILING PIECE

[76] Inventor: Lothar R. Wollmann, 88700 Shoreline Loop, Florence, Oreg. 94739

[21] Appl. No.: 732,616

[22] Filed: Jul. 19, 1991

[51] Int. Cl.⁵ ............................................. G07B 17/00
[52] U.S. Cl. .......................... 364/464.03; 177/25.15; 177/262
[58] Field of Search .................... 177/25.15, 261, 262; 364/464.02, 464.03

[56] References Cited

U.S. PATENT DOCUMENTS

| 4,122,532 | 10/1978 | Dlugos et al. | 364/464.02 |
| 4,286,325 | 8/1981 | Dlugos et al. | 364/464.03 |
| 4,325,440 | 4/1982 | Crowley et al. | 177/25.15 |
| 4,495,581 | 1/1985 | Piccione | 364/464.03 |
| 4,595,984 | 6/1986 | Daniels | 364/466 |
| 4,787,046 | 11/1988 | Feinland et al. | 364/464.03 |
| 5,021,963 | 6/1991 | Brown et al. | 364/464.02 |

*Primary Examiner*—Edward R. Cosimano
*Attorney, Agent, or Firm*—Irving Keschner

[57] ABSTRACT

A device for weighing and automatically computing the postage due on all services offered by a postal authority of a given country, both domestically and internationally. The device computes postage due and other varying charges such as insurance and Express Mail and incorporates a spring mounted electronic loadcell weighing mechanism, a weighing platform to allow for accommodation of large mailing pieces, a computer data chip providing country code and postal code (zip code) search features which is reprogrammable in the event of a postage rate or structure change, and a user programmable zip/zone conversion feature to tell the device where it is within a given postal zone system.

6 Claims, 2 Drawing Sheets

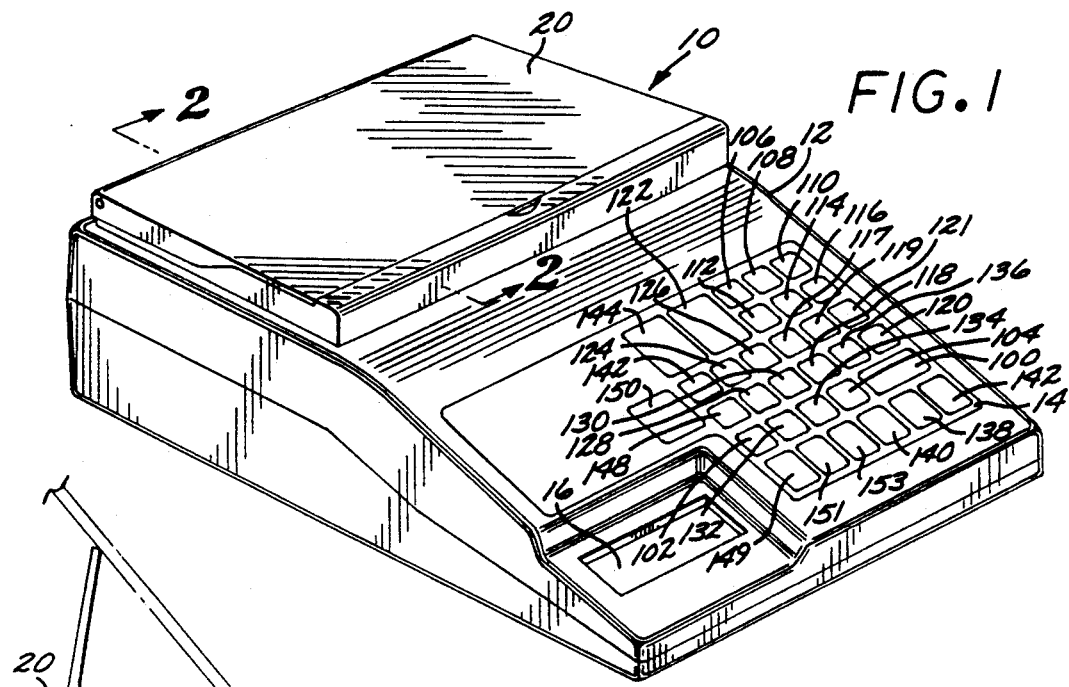
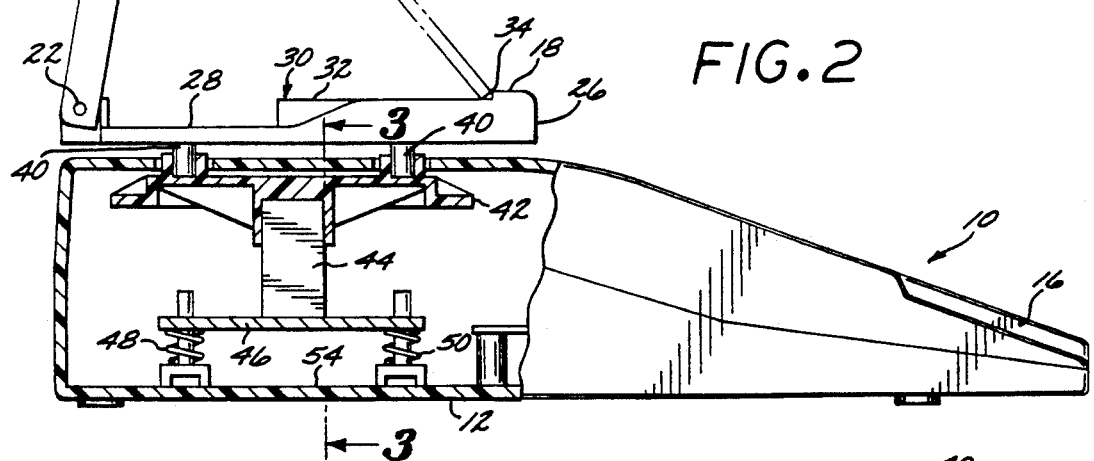
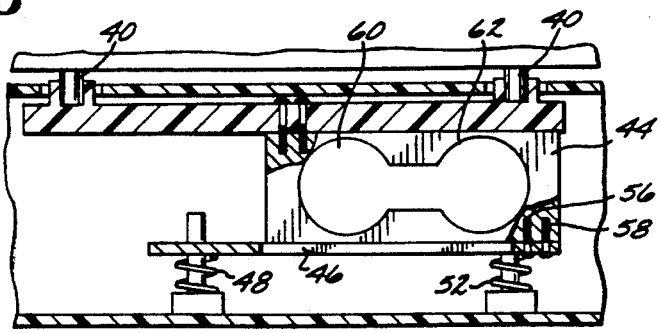

DEVICE FOR WEIGHING AND AUTOMATICALLY CALCULATING POSTAGE FOR A MAILING PIECE

BACKGROUND OF THE INVENTION

1. Field of the Invention

The present invention relates to a device for automatically computing the postage charges for services provided by a postal authority of a given country.

2. Background of the Invention

Devices for weighing mailing pieces and automatically computing the postal rate therefor have been commercially available. The weighing element of many such devices typically comprises a loadcell which uses a mechanical stop to protect against overload or shock. However, many times the mechanical stop is ineffective to prevent such damage. In addition, most letterscales utilize rather small platforms and to accommodate large envelopes, a separate component is typically attached to the permanent platform scale which requires the user to take the extra step of activating the Tare function of such a device. These prior art devices also have the capability of adapting to restructuring of postal services, i.e. rate changes by replacing the memory chip used therein with one reprogrammed to account for the new rates. These prior art devices also set their zip zone locations by supplying a separate preset memory chip to the end user which is then connected into the device, i.e. a post purchase add-on. These prior art devices also do not allow for user programming of the zip zone location nor its reprogramming by the end user if the device is moved to a new location. In this latter case, a new memory chip must be purchased which is preset to the new location.

In many types of situations, a number of services, both public and private, can be utilized to forward mailings, including packages, such as Express Mail and United Parcel Service. However, it is difficult to determine in a typical office environment which of the rates offered are the lowest for a particular service provided. Even among the services offered by the country postal authority, it can become difficult to ascertain postal costs without the need for office personnel going to the post office to obtain posting information.

What is desired therefore is to provide a device capable of comparing selected postal services and having the weighing loadcell protected from damage due to a shock or large weight. Also, the device preferably would include a weighing platform which allows large envelopes to be accurately weighed without the requirement of a separate weighing attachment. Finally, the device should include an initializing system allowing the end user to set the postzone location of the device so that it will know where it is for priority and fourth class mailings.

SUMMARY OF THE PRESENT INVENTION

The present invention provides a device for automatically computing the postage due for all services offered by a postal authority of a given country, both domestically and internationally.

The device incorporates a microprocessor programmed to enable a user to select the country of destination so that the rates for that country can be displayed for a mailing piece; a zipcode display feature for mailings in the United States; and the ability to allow the user to program zip/zone information directly into the device.

The loadcell is protected from overload or shock by mounting the loadcell support bracket on four adjustable coil springs which act as shock absorbers. When a shock or large weight over the capacity of the scale is placed on the weighing platform, the springs will yield and release the loadcell from the extra strain.

The weighing platform includes a lid portion which in a closed position functions in a conventional manner. To accommodate large envelopes without blocking the display or keyboard, the lid is opened and the envelope positioned between the upper portion of the lid and a step member in the lower portion of the platform.

The present invention thus provides a device for weighing and automatically computing the rates for various postal services in a rapid and efficient manner, thus enabling the device to function as an "in-house" postal office operating 24 hours a day. The microprocessor portion of the device can be easily reprogrammed to incorporate changes in postal rates. The device enables direct postage costs to be reduced and also eliminates the need for office personnel to go to the post office to obtain postal rates.

The durability of the device is extended by providing shock absorbers to protect the device loadcell from damage caused by shock, thus reducing replacement costs and downtimes which otherwise would occur when the device is off-line. Finally, the novel configuration of the weighing platform allows larger-sized mailing pieces to be accurately weighed, typically reducing postage costs and avoiding mail return if the postage applied to the mailing piece is insufficient.

DESCRIPTION OF THE DRAWINGS

For a better understanding of the invention as well as other objects and further features thereof, reference is made to the following description which is to be read in conjunction with the accompanying drawing wherein:

FIG. 1 is a perspective view of the postage device of the present invention;

FIG. 2 is a cross-sectional view along line 2—2 of FIG. 1;

FIG. 3 is a cross-sectional view along line 3—3 of FIG. 2; and

Figure 4:
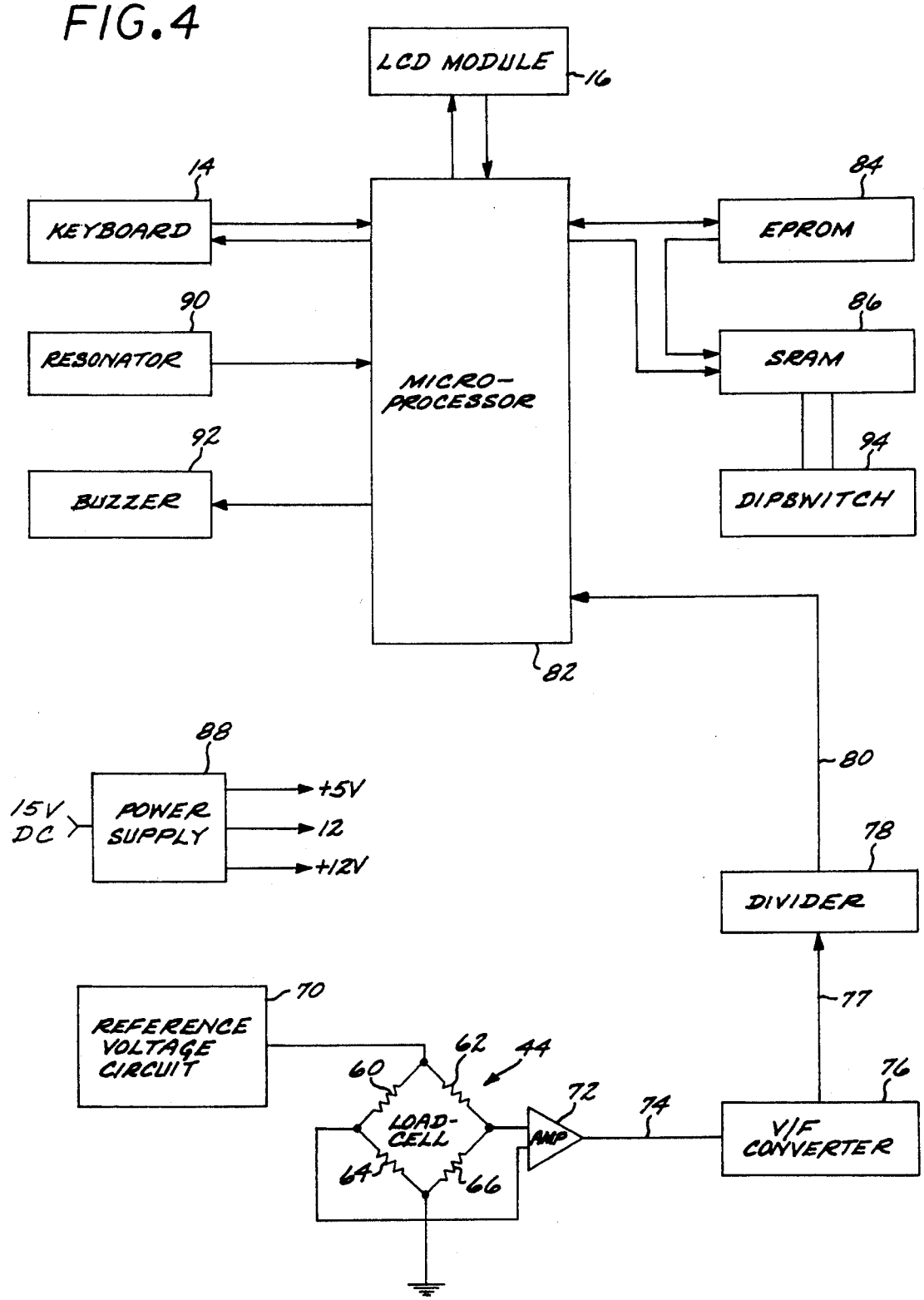
FIG. 4 is a simplified block diagram of the electronic system utilized in the postage device of the present invention.

The appendix is located in the patented file is the source code for the microprocessor utilized in the postage device of the present invention.

DETAILED DESCRIPTION OF THE INVENTION

Referring now to FIG. 1, a perspective view of the novel postage calculating device 10 of the present invention is illustrated. Device 10 comprises housing 12 having a touch type keyboard 14 formed thereon and a liquid crystal display (LCD), or readout, 16. A weighing platform 18, having a lid portion 20 (shown in the closed position), is positioned on the top of the upper portion of housing 12 as illustrated. In the position shown, weighing platform 18 is substantially rectangular in shape. Keyboard 14 is of the conventional membrane type with tactile response feeling and comprises embossed polyester film with silkscreened silver contacts. LCD 16, in the embodiment illustrated, comprises a conventional type, 2 lines times 16 character dot matrix.

FIG. 2 is a cross-sectional view along line 2—2 of FIG. 1 and illustrates weighing platform 18 with lid 20, hinged about pivot 22, in the open position to support an envelope 24 (shown in phantom) for weighing. As illustrated, base member 26 of platform 18 has a lower surface 28 and a step portion 30 having an upper surface portion 32 and a vertical edge portion 34. Envelope 24, or any other oversized mailing piece, is supported between the tip of lid portion 20 and edge portion 34 as shown. This arrangement places the center of gravity of envelope 24 approximately in the center of the weighing platform to achieve maximum accuracy and operating comfort. The platform lid can be opened to a maximum of 80 degrees from the horizontal, enabling thin envelopes to stand almost straight and thicker envelopes to be rested between lid 20 and the step in base member 26.

Weighing platform 18 is connected to main housing 12 by four cylindrically shaped members 40 (only two are shown in FIGS. 2 and 3), members 40 being embedded in a platform holder 42 which in turn is coupled to a conventional loadcell 44. The loadcell support bracket 46 is mounted on four coil springs (only springs 48, 50, and 52 are shown) which act as shock absorbers. The force of each spring is calculated to be slightly above ¼ the maximum permitted load on loadcell 44 so when a shock or large weight mailing piece is placed on platform 18, the springs will first compress to the initial weight shock and release loadcell 44 from the extra strain.

When a weight is placed on the platform (either in the closed or opened position), a force is transmitted to the loadcell 44. Loadcell 44 is affixed at one side to the bottom surface 54 of housing 12 via steel mounting bracket 46 and at the other end by screws 56 and 58. This mounting arrangement creates a lever arm which enables loadcell 44 to deform when weight is applied to platform 18. The loadcell 44 is designed so that the resulting stress is concentrated at certain points, four straingages 60, 62, 64, and 66 being attached thereat (only strain gages 60 and 62 are illustrated in FIG. 3).

Referring now to FIG. 4, a block diagram of the electronic components comprising device 10 is illustrated.

Straingages 60, 62, 64 and 66 (350 ohm) of loadcell 44 are wired in a bridge circuit as shown and change their resistances as a result of the load stress. This resistance change offsets the balance of the bridge-circuit. The straingage bridge is supplied with current by constant DC voltage from supply 70. Any variation in the bridge voltage is detected by amplifier 72 having a first, low noise DC operational amplifier stage, the output thereof (the inverting type) decreasing with the amount of force measured. However, the second stage of amplifier 72, an inverting type, is an operational amplifier and provides further amplification, the output signal therefrom on lead 74 increasing when the weight increases.

The DC analog output signal from the second amplifier stage on lead 74 is connected to a voltage to frequency converter circuit 76. The DC voltage is converted into a signal having a variable frequency, the frequency increasing (decreasing) linearly with the magnitude of the applied input voltage. Converter 76 also filters the AC noise components of the signal. The output from converter 76 on lead 77 is connected to divider 78 comprising a flip-flop. Divider 78 divides the output of converter 76 by two and also filters the digital shape of the signal. The output of flip-flop 78 on lead 80 is connected to a selected input port of microprocessor 82.

The microprocessor 82 determines the difference of frequency between an initial frequency (frequency of nil-weight applied) and the frequency corresponding to the weight of the mail piece positioned on platform 18.

The frequency for nil weight is about 500 Hz by calibration of offset at the first amplifier and 15500 Hz at 3000 gram weight. This corresponds with a 5 Hz per gram calibration. The calibrated value for 1000 gram (e.g., 5000 Hz.) is adjusted at the gain control potentiometer used with converter 76.

EPROM 84 is connected to microprocessor 82 and contains the system operating software (program), postage data and country list and is preferably a 128K to 4M CMOS EPROM, MASKROM or OTROM. SRAM 86 is used to store user programmable data, such as the zip/zone conversion chart and may comprise an 8K×8 or larger static Ram with battery back-up circuit using a lithium battery. If power is removed from the SRAM 86, the battery will supply power to sustain the memory data. As shown, keyboard 14 and LCD module 16 are both connected to microprocessor 82. The device power supply is illustrated by reference numeral 88 and converts 15 VDC supplied thereto (the AC power input to device 10 is first converted to the 15 VDC)±12 volts and +5 volts. Resonator 90, preferably an 8-MHz crystal or ceramic resonator, is connected to microprocessor 82. Buzzer 92 is connected to microprocessor 8 to provide audible feedback to the user and preferably comprises a ceramic transducer. Dipswitch 94 may be utilized in place of or parallel to SRAM 86 to provide certain settings for the scale software to monitor. The program which runs the functions of the device resides in EPROM 84 as noted hereinabove. The source code of the program is in the Appendix which is located in the patented file.

Microprocessor 82 is preferably an Mitsubishi M374508ISP, manufactured by Mitsubishi Electric Corporation, Tokyo, Japan.

The scale program is activated when the device is plugged in. Upon application of power, microprocessor 82 begins operating, primarily to check the keyboard 14 for key operation and to determine the weight on the platform as an internal reference. In this "semi-sleep" mode, LCD 16 is off.

When the ON key 100 is pressed, microprocessor 82 will turn on LCD 16, do an internal self-check, and then display the weight placed on the platform 18. A weight on the platform of up to 2 lbs. when the device is turned on, such as a container or carton to hold pieces to be weighed, will register as zero weight on the display. This is referred to as TARE-upon-turn-on.

Upon activation of the various keys on keyboard 14, microprocessor 82 is activated to retrieve instructions from EPROM 84 and SRAM 86. EPROM 84 also contains other vendor programmed data such as postal regulations, postage, and country code and zip code lists. SRAM 86 contains user programmed data, such as ZIP/ZONE conversion information.

Where microprocessor 82 is instructed to take information from the data portion of EPROM 84, it will first execute commands to fetch data from an internal program which is stored in the microprocessor RAM. This is required because both program and data are located in EPROM 84; therefore, a RAM routine is required to be able to fetch data therefrom.

SRAM 86 and EPROM 84 are located at the same address lines as illustrated; "FF" is programmed into the EPROM address locations (which are shared by SRAM). FF represents the digital (hex) equivalent of the number 15 which in its 8-bit form is 11111111; therefore, all 8 data lines are positive.

The SRAM data, if other than the "FF", will pull down the voltage on the data lines so that microprocessor 82 is able to recognize the data. For example, if the number 3 is stored in SRAM 86, the data lines will show 11000000. Six of the eight data lines have 0 and, therefore, will pull down the EPROM (FF) data to a voltage level recognizable by microprocessor 82.

SRAM programming is handled similarly—data is sent by microprocessor 82 on the data bus and because EPROM 84 is on the same bus, it cannot be programmed with low voltage and thus only SRAM 86 is programmed.

A battery back-up maintains SRAM data in case of removal of external power from device 10.

The LCD display 16 is handled by a separate 4-bit microcomputer—LCD driver which is located on the LCD module in a conventional manner. Write commands are issued by microprocessor 82 and then sent to the LCD driver for handling of the display.

When device 10 is on, the microprocessor 82 continuously completes the following tasks:

1. Standby: Monitors its input lines to see if a mail piece is positioned on the platform and, if so, determines the weight of the mail piece. In addition, the keyboard is monitored to see if a key has been pressed.

2. Key pressed: If a key is pressed, the instruction as requested by the key is executed and the LCD display is then updated with a new message; the microprocessor 82 then reverts to standby.

More specifically, the "ON/OFF" TARE key 100 is initially pressed to turn on device 10. The device will then go through an electronic self-test for 2-5 seconds. If the device is not stable, the display will not change. If a TARE or other load (weight of object placed on platform 18) of over 2 lbs. is being applied, the display will read "Overload" and beep. The beep sound will continue until the load is reduced to under 2 lbs.

When the device has passed its self-test and is ready for weighing, the display will read "1st Class/0 lb 0 oz/$0.29". The device is now ready for weighing and postage rate calculations.

A change between English/Spanish translation may be accomplished at any time by pressing the ENGLISH/SPANISH key 102.

The following sets forth the various capabilities of device 10. It should be obvious that the fee rates noted are subject to change and are set forth only for illustrative purposes.

POSTAL SELECTIONS

1. First Class/Priority

Device 10 automatically sets up to weigh first class after going through its self-test. The display will read "1st Class/0 lb 0 oz/$0.29". Pieces up to 10 lbs. (including +5 lbs. TARE) may be then weighed with automatic calculation and display of the postage due. The device will automatically switch from first class to priority for any piece over 11 oz. (as required by USPS REGULATIONS).

After the ZIP/ZONE DATA has been properly programmed into memory and the device "knows where it is", the destination zone of Priority Mail is selected as follows: The display will read: "Prior Zone 1", when a weight of over 11 oz. is applied. The display will read "Zip/Zone: ?". The destination zone is found by pressing the appropriate number key (1–8) (keys 106, 108 . . . 116, 117, 119 and 121) and then pressing the +/ENTER key 118. The display will then read "Prior Zone" (the zone selected) and will automatically calculate and display the postage due (the CE key 120 serves as a "clear" key if the incorrect zone is selected).

If the destination zone is not known, the device will automatically locate the zone from the ZIP/ZONE data that has been programmed into memory. The first three numbers of the destination zip code are entered when the display reads "ZIP/ZONE:?". Upon pressing the last of the three numbers, the device automatically determines the zone for the entered zip code, calculates and displays the postage due and destination zone.

To change zones for other pieces, the procedure is repeated, e.g., the ZIP/ZONE key 104 is pressed and the appropriate zone or zip code is entered (use CE key 120 to clear errors). Postage due is automatically calculated and displayed.

2. Third/Fourth Class

To mail pieces at third or fourth class rates, the 3rd/4th key 122 is pressed. The display will then read: "3rd Class/0 lb 0 oz/$0.29". Pieces up to 10 lbs. can be weighed with automatic calculation and display of the postage rate. Device 10 will automatically switch from 3rd to 4th Class for any piece over 1 lb. (as required by the USPS regulations). After the ZIP/ZONE DATA has been properly programmed into memory and device 10 "knows where it is", the destinations one of 4th Class mail will be selected as follows: The display will read: 4th cls Zone 1. To change zones, the instructions set forth above for zone changes of Priority Mail are followed.

3. International Mail

Since international mail postage rates and services vary depending upon the country of destination, a country code must be entered to tell the device the country of destination. The device of the present invention can store all countries of the world in memory and their respective Code Numbers are listed in documentation accompanying the device. Device 10 has an additional feature whereby if the Code Number List is not readily available, the name of the country of destination is keyed in and the device automatically locates and displays the country code. By pressing the ENTER key 118, the mailing piece is automatically weighed and postage due is displayed for that country.

The Country Code Search has several "time saving" features, such as Autotype, which searches ahead and displays automatically the nearest match so that the user does not have to type in the complete name of the country (4 letters max.).

A selection of INT'L AIR, INT'L SURFACE, PARCEL, SMALL PACKET, LETTER, or PRINTED MATTER keys 124, 126, 128, 130, 132, 134, respectively, by the user will result in a request for a country code. The display will read: "Ctry Code?". The appropriate Country code Number is selected from the list and entered (three digit code) by pressing the appropriate number keys on keyboard 16. If, for example, the code "110" is selected, the display will flash the name and country code of the selected country three times.

| Example: | ALBANIA |
| | Country Code 110 |

Device 10 will then automatically weigh and display postage due for the mailing piece (the CHANGE COUNTRY/O key 136 is pressed to change the selected country and instructions above are repeated. The CE serves as a "clear" key if an incorrect entry is made).

If the country code is not known, the name of the country is keyed in. When the display reads "Country Code?", the SPCL DLVY key 138 is pressed. The display will then read: "ENTER COUNTRY". Using the letters adjacent to the keys of the keyboard 14 (all the above noted keys (except keys 100, 138, 140 and 142) and keys 144, 146, 148, 149, 151 and 153 correspond to a letter of the alphabet), the first 4 letters of the desired country are keyed in.

| Example: | ALBA for ALBANIA |

Upon pressing the fourth letter, the device automatically searches and locates Albania and display reads as follows:

| Example: | ALBANIA |
| | Country Code 110 |

The ENTER key 118 is then pressed and the display flashes three times and then automatically weighs and displays the postage due for the mailing piece after considering all specific postage regulations and restrictions in memory for the selected country.

The country code search feature may also be accessed by keying the first, second or third letters of a country, followed by pressing the SPCL DLVY key 138 or the RTRN RCPT key 142. The Country code list is then accessed at the country of closest match to the letters entered. The display may read "cannot find" for a few seconds before proceeding to the nearest match country. By using the INSD key 140 or RTRN RCPT key 142, the user may browse up and down the country code list in alphabetical order. To select a country while browsing, the ENTER key 118 is pressed and the display flashes three times, the mailing piece being automatically weighed and the postage due displayed. While typing a country name, the INSD key 140 may be used as a space key and the CE key 120 for backspace.

4. Express Mail

For domestic Express Mail, the EXPRESS MAIL key 150 is pressed and device 10 automatically weighs and displays the postage due for any domestic Express Mail mailing piece.

For international Express Mail, the international mail service is selected, including the entry of the country of destination as described above. The EXPRESS MAIL key 150 is then pressed. If Express Mail service is available to the selected country, the display will read:

| EXP MAIL (I) | (Country Code of country selected) |
| (weight) | (postage due) |

If Express Mail service is not available to the selected country, the display will read "Selection Error" for a few seconds and then display "Ctry Code?" requesting another selection. To exit, the CHANGE COUNTRY key 130 is pressed, and the CE key 118 or the 1st Class key 144 is then pressed.

ZIP/ZONE DATA PROGRAMMING

To use the Priority and Fourth Class features of device 10, the "location" of the device is first programmed into memory. The user must first obtain from the Post Office a ZIP/ZONE Conversion Chart for the ZIP/ZONE location from which the device will be used. The data on this chart is then programmed into memory, as follows:

1. The "ENTER" key 118 and "ZIP/ZONE" key 104 are simultaneously pressed. If memory has never been programmed, the display will read "Mem empty", followed by "ZIP/004". The user should then key in the numbers on the Conversion Chart as requested by the device.

2. The chart will provide 3-digit numbers followed by a Post Zone Number.

| EXAMPLE: | 004-214/3 |

First, 214 is keyed in and ENTER key 118 pressed. The display will read "ZIP 004-214/ZONE?". The supplied zone number (0–8), (our Example 3) is keyed in and the ENTER key 118 pressed. Device 10 will then request data for the next chart entry by reading: "Zip 215—?". The chart will provide the numbers for the next entry.

| EXAMPLE: | 215-288/4. |

The user then enters 288 and Zone 4 using the same procedure as set forth above (the above procedure must be followed until "ZIP-999" is entered and the memory is full).

3. To quit the ZIP/ZONE program at any time, "CE" key 118 is pressed (the ZIP/ZONE memory is protected by a back-up battery source allowing for the unplugging of the adaptor without loss of memory). 4. If memory is already programmed and it must be changed, for example, if the scale has been moved to a location with a different zip code, the "+" key 118 and the "ZIP/ZONE" key 104 are both pressed. LCD 16 will display the following for about two seconds: Rewrite memory/PRESS ENTER. If not confirmed by pressing "ENTER" key 118, the programming function will abandon automatically. If the "ENTER" has been pressed, the memory can be reprogrammed using the same procedure as described above for programming a new device.

5. The ZIP/ZONE data for entry errors is reviewed as follows:

Keys 104 and 118 are pressed simultaneously. The display will read "Rewrite Memory/Press ENTER/ZIP" for approximately 2 seconds.

Key 104 is then pressed within these 2 seconds and the display will read:

| ZIP | ZONE |

| 004 (Selected Number) | (Selected Number) |
|---|---|

The user may browse up and down the ZIP/ZONE data by using the INSD key 140 and the RTRN RCPT key 142. To change a Zone number during browsing, simply press the appropriate number key (1-8) and the ZONE change will automatically be made (Note: ENTER need not be pressed).

6. To change a Zip number during browsing, key 104 is pressed a second time and the bottom line of the display will go blank.

The change is entered by selecting the appropriate number keys for the zip and zone, as follows: (Example: Zip 123-125 Zone 3):

| Press numbers 123 then ENTER (key 118) |
|---|
| Press numbers 125 then ENTER (key 118) |
| Press number 3 then ENTER (key 118) |

The change will automatically be entered into the ZIP/ZONE program.

To make additional entry corrections, key 104 is pressed and then the edit function is initiated.

To check the new entries or to continue browsing, keys 140/142 are pressed. The CE key is then pressed to exit (key 118).

SPECIAL SERVICES (REG, CERT, COD, INSD, SPCL DLVY, RTRN RCPT)

1. General a. "Selection Error"—device 10 is programmed only to allow user entries for services available for the class of mail and destination selected (including international services to all of the countries included in the Country Code List). For example, REG is not available for 4TH CLASS, COD is not available for International Mail and SPCL DLVY is not available to the country ADEN. If a service is selected that is not available for the class and/or destination selected, the display will read "Selection error" for approximately 1 second and sound an audible alarm (note that all audible alarms are provided by buzzer 92). The display will then return to the previously selected class and service.

b. "Excess Value"—the device is also preprogrammed to deny entry of excess values when value must be declared for the service selected and a value is entered in excess of that allowed by the regulations. Example: $1,000 is the maximum value for 1ST CLASS DOMESTIC MAIL. If a value in excess of $1,000 is entered the display will read "excess value" for approximately 1 second and sound a tone alarm. The display will then return to the previously selected class and service.

c. The CE key 118 is used to clear Special Service requests.

2. Registered (REG)

a. Domestic—this is available for 1ST and PRIORITY classes only ($1 to $1,000). The class of mail is selected and the REG key 149 is then pressed. The display will read "Enter Value". The declared value of the item is then entered (not to exceed $1,000) and the ENTER key 149 is then pressed. The device will automatically display the class and special service selected and the total postage due. Example: the display will read:

| 1ST Registered |
|---|
| 0 LB 0.1 oz $4.99 | b. International—with the exception of Canada, International Registered Mail will automatically be calculated by the device without entering a declared value. In these categories, the device will not request "Enter Value" and will go directly to a read-out of postage due.

3. Certified (CERT)

a. Domestic—this is available for 1ST/PRIORITY and 3RD/4TH Classes only. The class of mail is first selected and then key 151 pressed, and the device automatically displays postage due.

b. International—not available.

4. Collect On Delivery (COD)

a. Domestic—this is available for 1ST/PRIORITY and 3RD/4TH Classes, Values $1 to $500. The class of mail is selected and key 153 pressed. The value entries as prompted by the device are then entered as described for Registered above. The device will then automatically display postage due.

b. International—not available.

5. Insurance (INSD)

a. Domestic—available for 1ST/PRIORITY and 3RD/4TH Classes, Value $1 to $500. The class of mail is selected and key 140 pressed. The value entries are entered as prompted by the device (same as for Registered). The device will then automatically display postage due.

b. International—available in PARCEL class only (Surface and Air not available to all countries), Values $1 to $500. The values are entered as prompted by device 10, the postage due being automatically displayed.

6. Delivery (SPCL DLVY)

a. Domestic—available for 1ST/PRIORITY and 3RD/4TH Classes. The class of mail is selected and key 138 pressed. The device then automatically displays postage due.

b. International—the availability and cost of this service is country dependent. The device will reject requests for unavailable services, and will accept and automatically display postage due for classes and destinations available.

7. Return Receipt (RTRN RCPT)

a. Domestic—available with Special Service selections Registered, Certified, and Insurance (when value over %50). The RTRN RCPT key 142 is pressed and the device automatically adds the fee for this service to postage due.

b. International—Country dependent as to availability in Registered and/or Insured mail. The device rejects requests when this service is unavailable and automatically adds the fee for this service to postage due when it is available.

8. Add Feature a. After the selection of any class of Domestic or International Mail and/or the selection of any Special Service, the user may add from $.01 to $9.99 to the total dollar figure displayed.

b. To activate the Add Feature, the user makes all entries necessary for the display to read postage due and then presses the ENTER/+ key 118. The display will then read: Add $0.00.

c. By using the numbered keys, values to be added will be displayed. Example: To add $1.23, the 1, 2, and 3 keys 106, 108 and 110 are pressed and the display reads "Add $1.23". The ENTER key 118 is then pressed and the device automatically adds the indicated amount to the total displayed.

d. The CE key 120 is used as a backspace and to clear the Add mode.

9. Multiple Service Selections a. To select multiple services, the Service Selection keys are pressed for the services desired and the values entered as prompted by the device. The display will automatically display the cumulative total of postage due. Also, the display will indicate the following code letters for services selected:

REG—R
CERT—C
COD—O
INSD—I
SPCL DLVY—SP
RTRN RCPT—T
ADD—+ b. After selecting one or more of the Special Services and entering values as required (REG, CERT, COD, INSD, SPCL DLVY, RTRN RCPT), the user may do a self-check of these selections by pressing the i/l/c key 106. Upon pressing this key, the display automatically scrolls the class and service that have been selected by the user and displays the cost of each such class and service.

SUMMARY OF MULTIPLE FUNCTION KEY USAGE

1. CE Key 120
   a. Acts as backspace in value or data entry.
   b. Clears Special Services back to basic class.
   c. Escape from "Enter Country Code".
   d. Escape from "Enter Zip/Zone".
2. ZIP/ZONE key 104
   a. Only used in PRIORITY or 4TH CLASS.
   b. Zones are limited 1-8.
   c. Zip must be programmed to 999 to retain ZIP/ZONE data in memory.
3. ENTER/+ key 118
   Allows for added value from $.01 to $9.99.
4. CANADA/7 key 117: For mailing to Canada in all categories, the category, e.g., 1ST, 3RD, INT'L, EXPRESS MAIL is selected and the CANADA/7 key pressed for automatic calculations for Canada.
5. MEXICO/9 key 121: Same as 4 above for mailings to Mexico.
6. SPCL DLVY key 138
   a. For selecting the service Special Delivery.
   b. To access program to enter country of destination alphabetically.
   c. To access the Country Code List Search feature after entering 1, 2 or 3 letters of a country.
7. INSD key 140
   a. For selecting the service Insured Mail.
   b. To browse up the Country Code List after this list is accessed.
8. RTRN RCPT key 142
   a. For selecting the service Return Receipt Requested.
   b. To access the Country Code List Search feature after 1, 2 or 3 letters of country are entered.
   c. To browse down the Country Code List after this list is accessed.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A device for weighing and automatically computing postage due for a mailing piece comprising:
    a main housing having means mounted therein for weighing said mailing piece;
    a weighing platform operatively coupled to said weighing means, said platform comprising a lid portion and a base member, said lid portion being pivotably connected to said base member and having first and second positions, said platform forming a substantially rectangular shaped member when said lid is in said first position, the lid portion being in contact with the mailing piece being weighed, said lid portion, when in said second position, forming an angle with said base member, said mailing piece being supported for weighing between an edge formed in said base member and the tip of said lid portion when said lid portion is in said second position;
    a microprocessor; and
    memory means associated with said microprocessor for providing postal data thereto including postal rates, said memory means being reprogrammable in the event of a postage rate change, said microprocessor calculating the postage due for a mailing piece positioned on said weighing platform.

2. The device of claim 1 wherein said postal data includes zip-to-zone conversions and further including a user keyboard for enabling the user to directly reprogram the device to accommodate for postal rate changes.

3. The device of claim 2 wherein the device is reprogrammed by a user via keyboard entry with respect to zip-to-zone data to take into account the location of the device.

4. The device of claim 1 wherein the supporting tip of said lid portion is spaced from the pivotal connection of said base member and said lid portion.

5. The device of claim 4 wherein said housing has a bottom surface, a first surface of said lid portion contacting said mailing piece when said lid portion is in said first position, said upper surface of said lid portion being substantially parallel to said housing bottom surface.

6. The device of claim 5 wherein the angle formed by said lid portion when in said second position is less than 90 degrees from the horizontal plane formed by the surface of said lid portion when said lid portion is in said first position.

* * * * *